US012623526B2

(12) United States Patent
Shin

(10) Patent No.: US 12,623,526 B2
(45) **Date of Patent: *May 12, 2026**

(54) BATTERY ASSEMBLY MOUNTING STRUCTURE FOR A VEHICLE

(71) Applicants: HYUNDAI MOTOR COMPANY, Seoul (KR); KIA CORPORATION, Seoul (KR)

(72) Inventor: Gyung Hoon Shin, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 747 days.

This patent is subject to a terminal disclaimer.

(21) Appl. No.: 18/076,154

(22) Filed: Dec. 6, 2022

(65) Prior Publication Data

US 2024/0034140 A1 Feb. 1, 2024

(30) Foreign Application Priority Data

Jul. 26, 2022 (KR) ........................ 10-2022-0092617

(51) Int. Cl.
*H01M 50/262* (2021.01)
*B60K 1/04* (2019.01)
*B60L 50/60* (2019.01)
*H01M 50/204* (2021.01)

(52) U.S. Cl.
CPC ................ *B60K 1/04* (2013.01); *B60L 50/66* (2019.02); *H01M 50/204* (2021.01); *H01M 50/262* (2021.01); *H01M 2220/20* (2013.01)

(58) Field of Classification Search
CPC ........... B60K 1/04; B60L 50/64; B60L 50/66; H01M 2220/20; H01M 50/204; H01M 50/262
See application file for complete search history.

(56) References Cited

U.S. PATENT DOCUMENTS

| | | | |
|---|---|---|---|
| 5,288,191 A | 2/1994 | Rueckert et al. | |
| 11,476,521 B2 | 10/2022 | Masaryk | |
| 2013/0180791 A1* | 7/2013 | Lejeune | B60K 1/04 180/68.5 |
| 2020/0321572 A1* | 10/2020 | Bengtsson | H01M 50/264 |
| 2021/0175564 A1 | 6/2021 | Masaryk | |

(Continued)

FOREIGN PATENT DOCUMENTS

| | | |
|---|---|---|
| EP | 3522292 B1 | 1/2021 |
| JP | 2012215235 A | 11/2012 |

(Continued)

*Primary Examiner* — Holly Rickman
*Assistant Examiner* — Linda N Chau
(74) *Attorney, Agent, or Firm* — Lempia Summerfield Katz LLC

(57) ABSTRACT

Disclosed is a battery assembly mounting structure for a vehicle. The battery assembly mounting structure includes: a battery assembly provided with an opening a constant shape in cross section from the bottom toward the top; a fastening bolt fastened passing through the opening from the lower side to the upper side; and a swappable assembly including an outer side to be mounted to and demounted from the opening through the lower side of the opening, and an inner side to and from which the fastening bolt is mounted and demounted, and providing elastic support between the outer side and the inner side.

15 Claims, 12 Drawing Sheets

(56)     References Cited

U.S. PATENT DOCUMENTS

2021/0387583 A1     12/2021  Ki et al.
2024/0326642 A1*   10/2024  Khullar .................. B60L 53/80

FOREIGN PATENT DOCUMENTS

KR           102175538  B1     11/2020
KR       20210001334  A       1/2021
KR       20210017120  A       2/2021
KR       20210155246  A      12/2021
KR       20220022925  A       3/2022

* cited by examiner

BATTERY ASSEMBLY MOUNTING STRUCTURE FOR A VEHICLE

CROSS REFERENCE TO RELATED APPLICATION

The present application claims priority to Korean Patent Application No. 10-2022-0092617, filed Jul. 26, 2022, the entire contents of which are incorporated herein by reference.

BACKGROUND

Field of the Present Disclosure

The disclosure relates to a structure for mounting a battery assembly to a lower side of a vehicle.

Description of the Related Art

An electric vehicle, a hybrid vehicle or the like is mounted with a high voltage battery (hereinafter referred to as a "battery assembly"), and the battery assembly is likely to be mounted to a lower side of a vehicle body.

In particular, the electric vehicle has a disadvantage in that charging time is relatively longer than refueling time of a general internal combustion engine vehicle. To solve this disadvantage, a method of attaching and detaching a replaceable battery assembly to and from a vehicle body has been sought.

Matters described as the related art are provided merely for promoting understanding for the background of the disclosure, and should not be taken as the prior art already known to a person having ordinary knowledge in the art.

SUMMARY OF THE PRESENT DISCLOSURE

An aspect of the disclosure is to provide a battery assembly mounting structure for a vehicle, in which a fastening bolt for mounting a battery assembly to a lower side of a vehicle body maintains an assembled state with the battery assembly even when the battery assembly is separated from the vehicle body, so that the fastening bolt can be reusable without the need of handling the fastening bolt separately from the battery assembly when the battery assembly is repetitively detached from and attached to the vehicle body.

Another aspect of the disclosure is to provide a battery assembly mounting structure for a vehicle, in which an assembly tolerance is easily covered when the battery assembly is mounted to the vehicle body, and a fastening angle of a fastening bolt is appropriately guided to prevent erroneous fastening, thereby securing assembling and disassembling workability, and providing easy replaceability of the fastening bolt when the fastening bolt is damaged.

Still another aspect of the disclosure is to provide a battery assembly mounting structure for a vehicle, which can be easily replaced even while the battery assembly is mounted to the vehicle body when the battery assembly mounting structure itself needs to be replaced as it is damaged or deformed.

According to an embodiment of the disclosure, a battery assembly mounting structure for the vehicle includes: a battery assembly equipped with an opening having a constant shape in cross section from a lower side toward an upper side; a fastening bolt fastened passing through the opening from the lower side to the upper side; and a swappable assembly including an outer side and an inner side and configured to provide elastic support between the outer side and the inner side. The outer side is configured to be mounted to and demounted from the opening through the lower side of the opening, and the fastening bolt is mounted to and demounted from the inner side of the opening.

The swappable assembly may include: a first fixing guide rectilinearly moving upwards toward the opening and coupled to the inside of the opening; a sleeve elastically supporting the fastening bolt to be mounted and dismounted inside the first fixing guide; a second fixing guide disposed between the first fixing guide and the sleeve; and a guide spring elastically supporting the sleeve with respect to the second fixing guide.

The first fixing guide may be integrally provided with: a fixing protrusion elastically coupled to a fixing groove formed inside the opening; and a tool insertion hole through which a tool for pulling the first fixing guide downwards from the opening so that the fixing protrusion can be separated from the fixing groove.

The first fixing guide may be integrally provided with: an upper restricting portion for restricting an upper end of the second fixing guide; and a lower restricting portion for elastically restricting a lower end of the second fixing guide.

The lower end of the second fixing guide may be formed with a tool insertion groove communicating with the tool insertion hole of the first fixing guide; and the lower restricting portion of the first fixing guide may be formed to block the lower end of the tool insertion groove.

the sleeve may include:

a cylindrical unit guiding the fastening bolt to rectilinearly move up and down while surrounding the outer circumference of the fastening bolt;

a plurality of elastic supporters protruding downward from the cylindrical unit;

a holding protrusion having a shape that becomes narrower toward the inside of the cylindrical unit and wider again upward from a lower end of the elastic supporter.

The sleeve may include a plurality of cut-out grooves cut in up and down directions of the cylindrical unit to separate the elastic supporter and the cylindrical unit.

The guide spring may include a plurality of leaf springs connecting the second fixing guide and the sleeve; and the surface of the leaf spring may be disposed in parallel with the lengthwise direction of the sleeve.

The guide spring may include the plurality of leaf springs disposed between the second fixing guide and the sleeve to form a vertex shape centered upon the sleeve.

The guide spring may include an end portion bent to have a 'U'-shape to be fixed to the second fixing guide; and the U-shaped end portion of the guide spring may be fitted to a spring mounting groove formed in the second fixing guide while surrounding both wall sides of the second fixing guide.

The spring mounting groove of the second fixing guide may be opened upwards; and the upper restricting portion of the first fixing guide may be formed to restrict the upper end of the spring mounting groove in which the guide spring is inserted.

The opening may be formed in a mounting bush coupled to the side member of the battery assembly.

The side member may include a lower end supporter to support the lower end of the mounting bush; and the lower end supporter may be formed with an assembly through hole via which the swappable assembly passes to be inserted in or separated from the mounting bush.

The side member may have a cross-sectional structure where the lower end supporter and a surrounding supporter disposed above the lower end supporter and surrounding and supporting the mounting bush are spaced apart up and down from each other.

The side member may have a cross-sectional structure where a head cover formed with a head through hole, through which a head of the fastening bolt passes, is disposed being separated from the lower side of the lower end supporter.

The opening may be formed in a through pipe installed passing through an inside of the battery assembly.

According to the disclosure, a fastening bolt for mounting a battery assembly to a lower side of a vehicle body maintains an assembled state with the battery assembly even when the battery assembly is separated from the vehicle body, so that the fastening bolt can be reusable without the need of handling the fastening bolt separately from the battery assembly when the battery assembly is repetitively detached from and attached to the vehicle body.

Further, an assembly tolerance is easily covered when the battery assembly is mounted to the vehicle body, and a fastening angle of a fastening bolt is appropriately guided to prevent erroneous fastening, thereby securing assembling and disassembling workability, and providing easy replaceability of the fastening bolt when the fastening bolt is damaged.

In addition, a battery assembly mounting structure for a vehicle according to the disclosure is easily replaceable even while the battery assembly is mounted to the vehicle body, in a case where the battery assembly mounting structure itself needs to be replaced as it is damaged or deformed.

BRIEF DESCRIPTION OF THE DRAWINGS

In order that the disclosure may be well understood, there will now be described various forms thereof, given by way of example, reference being made to the accompanying drawings, in which.

Figure 1:
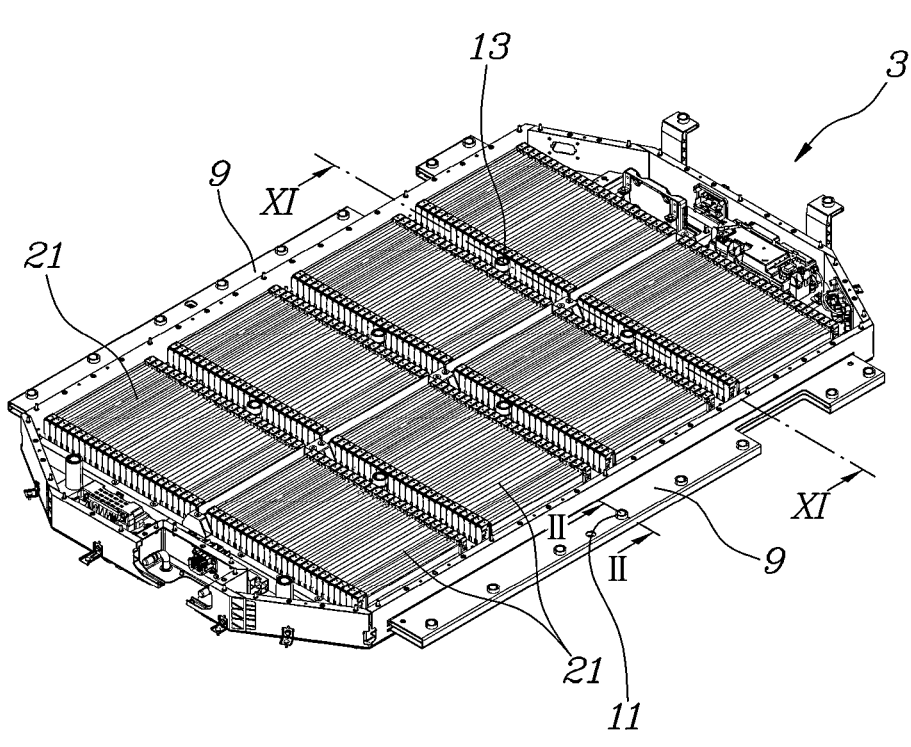
FIG. 1 is a view illustrating a battery assembly of a vehicle to which a mounting structure according to an embodiment of the disclosure is applied.

The drawings described herein are for illustration purposes only and are not intended to limit the scope of the present disclosure in any way.

DETAILED DESCRIPTION

Hereinafter, embodiments of the present disclosure are described in detail with reference to the accompanying drawings, in which the same or similar elements are denoted by the same reference numerals even though they are depicted in different drawings and redundant descriptions thereof are avoided.

Suffixes "module" and "unit" put after elements in the following description are given in consideration of only ease of description and do not have meaning or functions discriminated from each other.

In terms of describing the embodiments of the disclosure, detailed descriptions of related art have been omitted when they may make the subject matter of the embodiments of the disclosure rather unclear. In addition, the accompanying drawings are provided only for a better understanding of the embodiments of the disclosure and are not intended to limit technical ideas of the disclosure. Therefore, it should be understood that the accompanying drawings include all modifications, equivalents and substitutions within the scope and sprit of the disclosure.

Terms such as "first" and "second" may be used to describe various components, but the components should not be limited by the above terms. In addition, the above terms are used only for the purpose of distinguishing one component from another.

When it is described that one component is "connected" or "joined" to another component, it should be understood that the one component may be directly connected or joined to another component, but additional components may be present therebetween. However, when one component is described as being "directly connected," or "directly coupled" to another component, it should be understood that additional components may be absent between the one component and another component.

Unless the context clearly dictates otherwise, singular forms include plural forms as well.

In the disclosure, it should be understood that term "include" or "have" indicates that a feature, a number, a step, an operation, an element, a part, or the combination thereof described in the embodiments is present, but does not preclude a possibility of presence or addition of one or more other features, numbers, steps, operations, elements, parts or combinations thereof, in advance.

Further, terms "unit" or "control unit" forming part of the names of a motor control unit (MCU), a hybrid control unit (HCU), etc., are merely terms that are widely used in the naming of a controller for controlling a specific function of a vehicle, and should not be construed as meaning a generic function unit. When a component, device, element, or the like of the present disclosure is described as having a purpose or performing an operation, function, or the like, the component, device, or element should be considered herein as being "configured to" meet that purpose or to perform that operation or function.

The control unit may include a communication device that communicates with other control units or sensors, in order to control its own functions, a memory that stores an operating system, logic commands, and input/output information, and one or more processors that perform determination, calculation, decision, and the like, which is desired for the control of the function that is responsible therefor.

Figure 2:
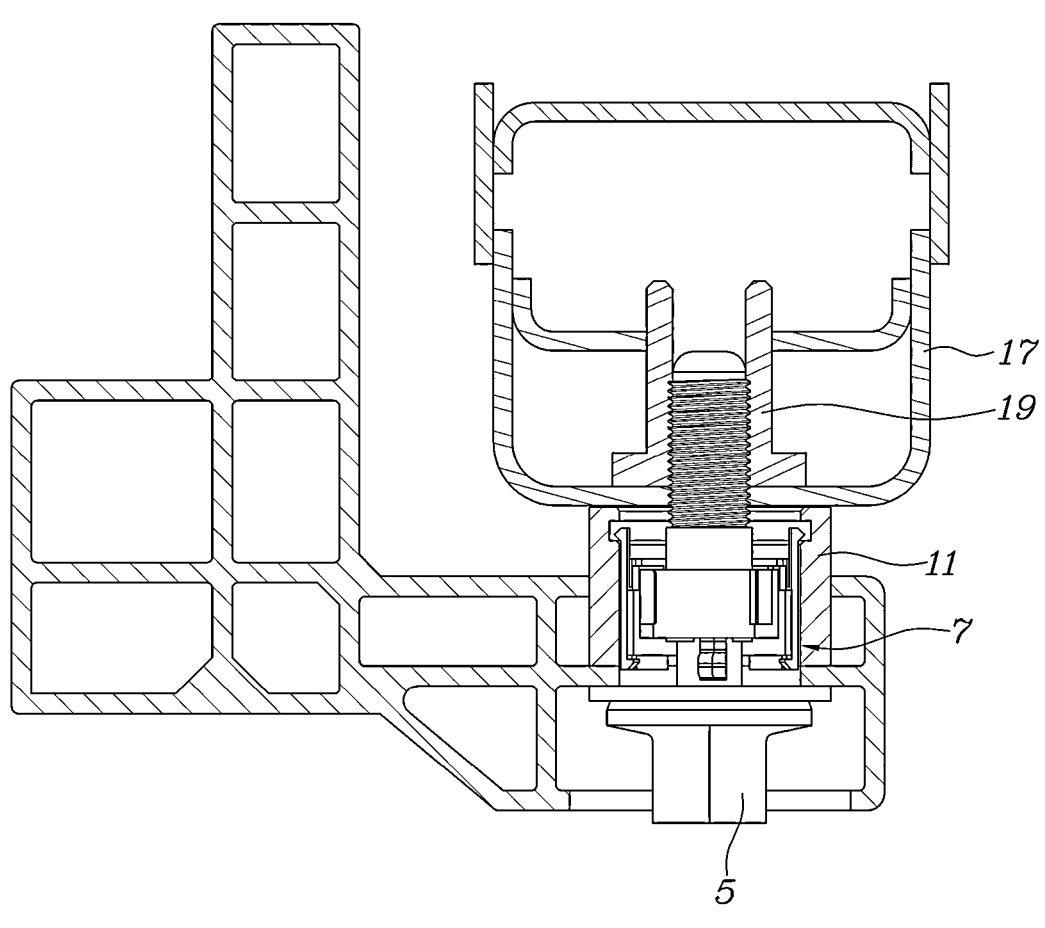
FIG. 2 is a cross section view taken along line II-II of FIG. 1.
Figure 3:
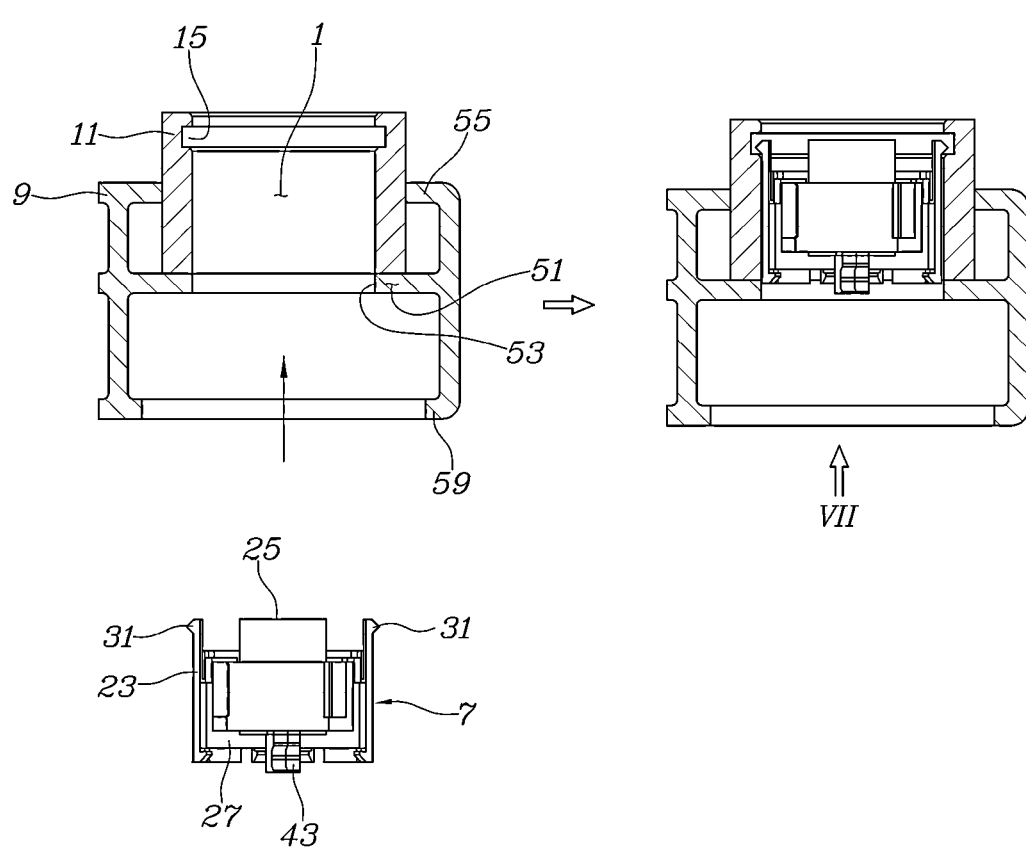
FIG. 3 is a perspective view illustrating a process that a swappable assembly is coupled to a mounting bush of a side member.

Referring to FIGS. 1 to 9, a battery assembly mounting structure for a vehicle according to an embodiment of the disclosure includes a battery assembly 3 provided with an opening 1. As illustrated in FIG. 3, a cross sectional shape of the opening 1 is constant from a lower side (e.g., the bottom) toward an upper side (e.g., the top) of the opening. For example, a cross-sectional shape of the opening 1 is constant from the bottom toward the top. The battery assembly 3 further includes a fastening bolt 5 configured to pass through the opening 1 from the lower side (or the bottom) to the upper side (or the top); and a swappable assembly 7 including an outer side to be mounted to and demounted from the opening 1 through the lower side of the opening 1. The swappable assembly 7 further includes an inner side to and from which the fastening bolt 5 is mounted and demounted, and the swappable assembly 7 provides elastic support between the outer side and the inner side.

In other words, according to the disclosure, the fastening bolt 5 is elastically supported via the swappable assembly 7 in the opening 1 provided in the battery assembly 3. Because the fastening bolt 5 is detachably mounted to the swappable assembly 7, and the swappable assembly 7 is detachably mounted to the opening 1, it is easy to replace the swappable assembly 7 with respect to the battery assembly 3 or replace the fastening bolt 5 with respect to the swappable assembly 7.

In another embodiment, the opening 1 provided in the battery assembly 3 may be formed in a mounting bush 11 provided in a side member 9 or may be formed in a through pipe 13 passing through the battery assembly 3 (to be described later). In the embodiments, common features of the opening 1 are that a fixing groove 15 for fixing the swappable assembly 7 is provided in the opening 1, and the lower side of the fixing groove 15 has a cross section evenly formed in up and down directions, so that the swappable assembly 7 can rectilinearly move upward to be fixed to the fixing groove 15 or rectilinearly move downward to be separated from the fixing groove 15.

Therefore, when the swappable assembly 7 is damaged or deformed and thus required to be replaced, the swappable assembly 7 is easily replaced in such a way that the existing swappable assembly 7 is removed from the lower side of the opening 1 and a new swappable assembly 7 is pushed into the upper side of the opening 1.

As described above, the swappable assembly 7 is demountable or mountable through the lower side of the opening 1, so that the swappable assembly 7 that needs to be replaced can be replaced without completely removing the battery assembly 3 from the vehicle body, thereby securing very easy maintenance.

Referring to FIG. 2, a vehicle body 17 is positioned above the mounting bush 11, and the vehicle body 17 includes a weld nut 19 so that the fastening bolt 5 can be fastened to the weld nut 19, thereby attaching the battery assembly 3 to the vehicle body 17.

Here, the meaning of the 'vehicle body' includes a frame of a vehicle having the frame. The battery assembly 3 according to the disclosure is applicable to not only a vehicle that includes the frame separately from the vehicle body, but also a vehicle that has a monocoque vehicle body with no distinction between the frame and the vehicle body, and therefore the term 'vehicle body' is intended to cover all such vehicles.

The element substantially positioned above the mounting bush 11 of FIG. 2 may be a frame in the case of the vehicle having the frame, and may be a vehicle body member in the case of the vehicle having the monocoque vehicle body.

Further, the battery assembly 3 may have a structure as shown in FIG. 1, in which a plurality of battery modules 21 are loaded being surrounded with a side member 9. In the state as shown in FIG. 1, an upper cover (not shown) is substantially added to the upper side and configured to protect the battery modules 21 therein.

In one embodiment, the swappable assembly 7 includes: a first fixing guide 23 rectilinearly moving upwards toward the opening 1 and coupled to the inside of the opening 1; a sleeve 25 elastically supporting the fastening bolt 5 to be mounted or dismounted inside the first fixing guide 23; a second fixing guide 27 disposed between the first fixing guide 23 and the sleeve 25; and a guide spring 29 elastically supporting the sleeve 25 with respect to the second fixing guide 27.

In other words, the first fixing guide 23 is mounted to or demounted from the opening 1, and the fastening bolt 5 is mounted to or demounted from the sleeve 25. In particular, the guide spring 29 provides elastic support between the sleeve 25 and the first fixing guide 23 as well as between the sleeve 25 and the second fixing guide 27.

The first fixing guide 23 is integrally provided with a fixing protrusion 31 elastically coupled to the fixing groove 15 formed inside the opening 1. The first fixing guide 23 is further provided with a tool insertion hole 33 through which a tool can be inserted to pull the first fixing guide 23 downward from the opening 1 so that the fixing protrusion 31 can be separated from the fixing groove 15.

Further, the first fixing guide 23 is integrally provided with an upper restricting portion 35 for restricting the upper end of the second fixing guide 27. In addition, the first fixing guide 23 is integrally provided with a lower restricting portion 37 for elastically restricting the lower end of the second fixing guide 27.

Meanwhile, a tool insertion groove 39 communicating with the tool insertion hole 33 of the first fixing guide 23 is formed at the lower end of the second fixing guide 27. The lower restricting portion 37 of the first fixing guide 23 is formed to block the lower end of the tool insertion groove 39.

Figure 7:
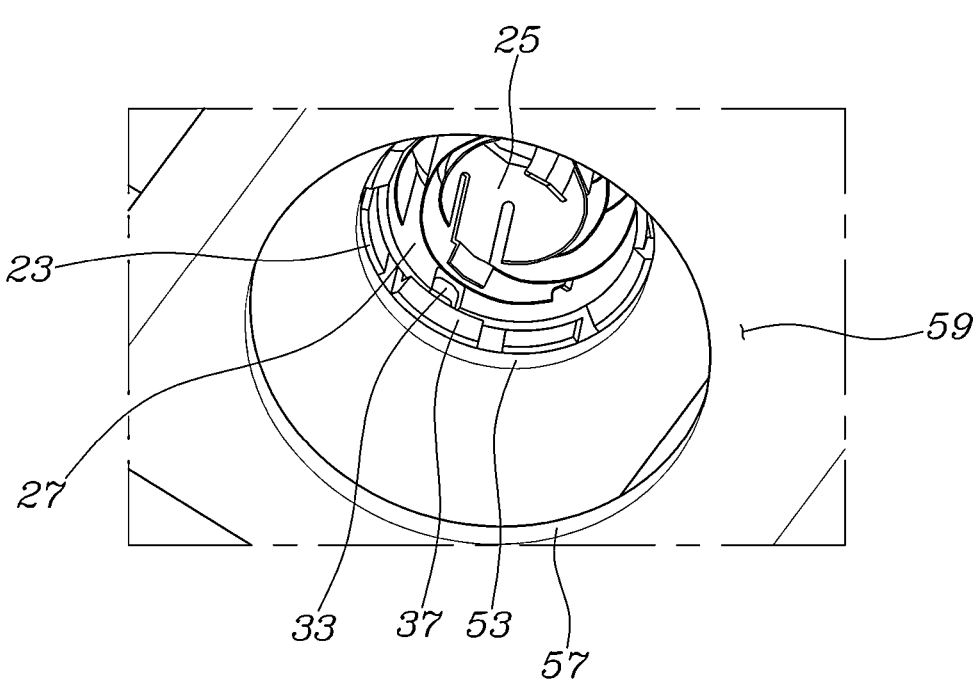
FIG. 7 is a view viewed in the direction of VII of FIG. 3.

Therefore, as shown in FIG. 7, when a hook or the like tool is inserted in the tool insertion groove 39 of the second fixing guide 27 and the tool insertion hole 33 of the first fixing guide 23 and then pulled downwards, the fixing protrusion 31 of the first fixing guide 23 is separated from the fixing groove 15, thereby allowing the swappable assembly 7 to be easily removed through the lower side of the opening 1.

Meanwhile, the sleeve 25 includes: a cylindrical unit 41 surrounding the outer circumference of the fastening bolt 5 and guiding the fastening bolt 5 to rectilinearly move up and down; the elastic supporter 43 protruding downward from the cylindrical unit 41; and a holding protrusion 45 having a shape that becomes narrower toward the inside of the cylindrical unit 41 and wider again upward from a lower end of the elastic supporter 43.

Figure 9:
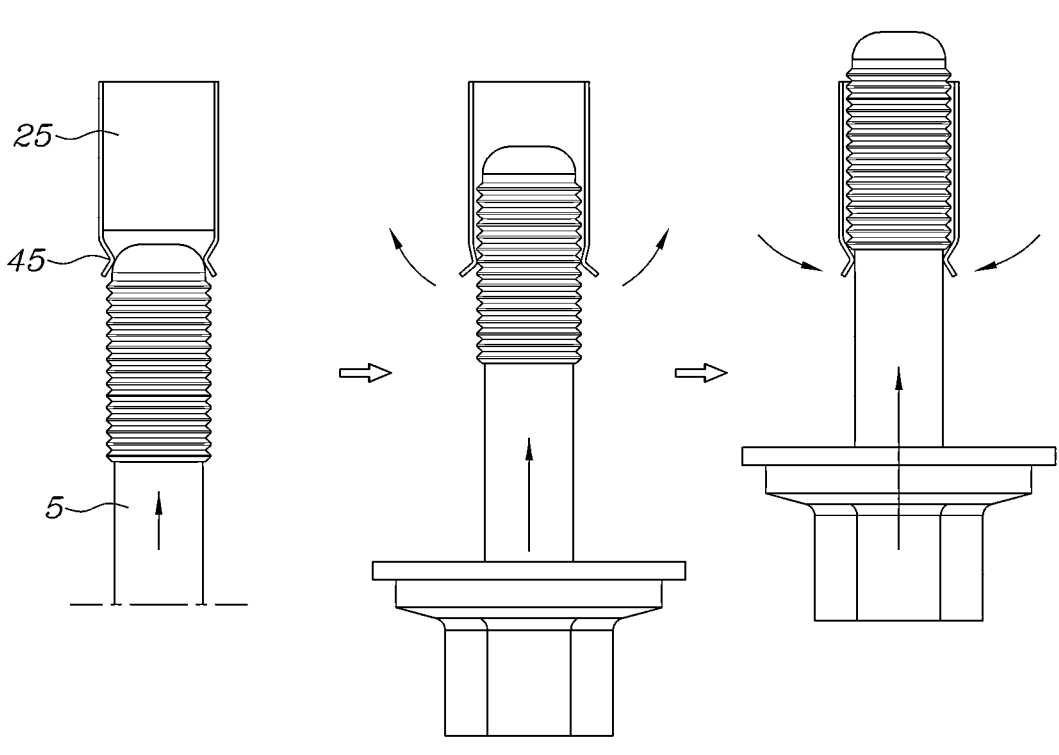
FIG. 9 is a view illustrating operations of an elastic supporter and holding protrusion of the sleeve.

Therefore, as illustrated in FIG. 9, when the fastening bolt 5 is rectilinearly moved upward from the lower side of the sleeve 25, the fastening bolt 5 is guided by the holding protrusions 45 of the sleeve 25 to enter the cylindrical unit 41. Then, the elastic supporter 43 is elastically opened to allow the fastening bolt 5 to move up through the cylindrical unit 41 as the fastening bolt 5 rises, thereby ultimately making all the threads of the fastening bolt 5 be moved to the upper side of the holding protrusion 45 and be fastened to the weld nut 19 of the vehicle body 17.

Here, a cut-out groove 47 for separating the elastic supporter 43 from the cylindrical unit 41 is vertically formed between the elastic supporter 43 and the cylindrical unit 41, so that the elastic supporter 43 can be easily transformed allowing the entry of the fastening bolt 5 when the fastening bolt 5 is rectilinearly moved upward and inserted in the sleeve 25.

Figure 8:
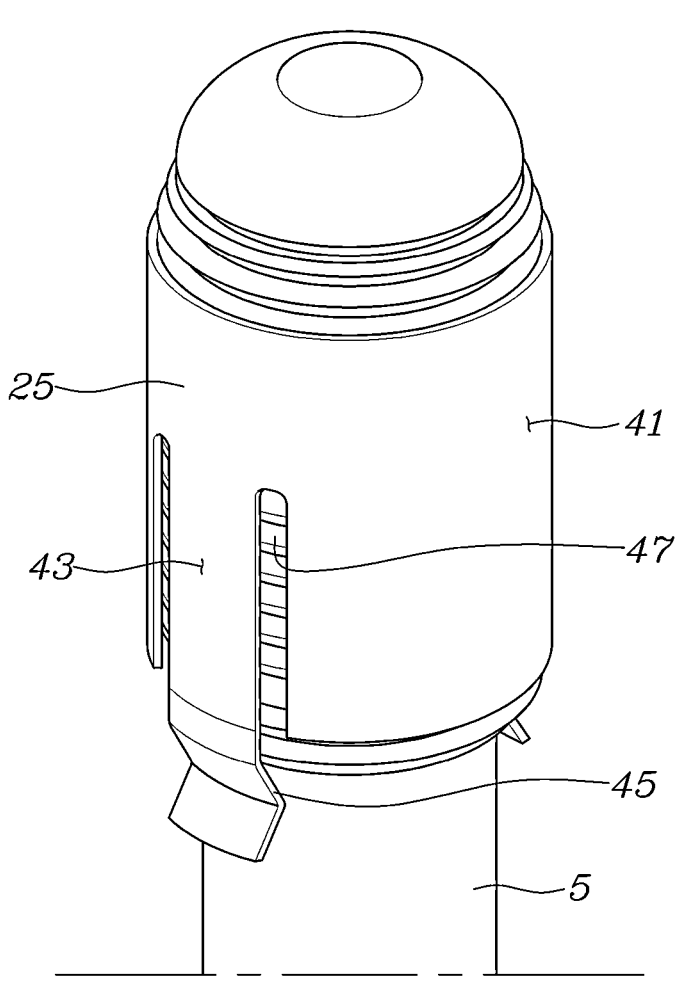
FIG. 8 illustrating a detailed structure of a sleeve according to an embodiment of the present disclosure.

As discussed above, to make the fastening bolt 5 easily enter the sleeve 25, as shown in FIG. 8, the cut-out groove 47 may be formed to be longer than half of the vertical length of the cylindrical unit 41.

As described above, the elasticity of the elastic supporter 43 and the holding protrusion 45 makes the fastening bolt 5 inserted in the sleeve 25 be not separated from the sleeve 25 unless an additional external force acts thereon even though the fastening bolt 5 is not fastened to but released from the weld nut 19 of the vehicle body 17.

Therefore, when the battery assembly 3 is repetitively mounted to and demounted from the vehicle body 17, the fastening bolt 5 is reusable without handling the fastening bolt 5 separately from the battery assembly 3, thereby improving workability.

When the fastening bolt 5 is damaged, the fastening bolt 5 is pulled downwards from the sleeve 25 and removed to be replaced with a new one.

The guide spring 29 includes a plurality of leaf springs connecting the second fixing guide 27 and the sleeve 25. In one embodiment, a surface of the leaf spring is disposed in parallel with the lengthwise direction of the sleeve 25.

Figure 10:
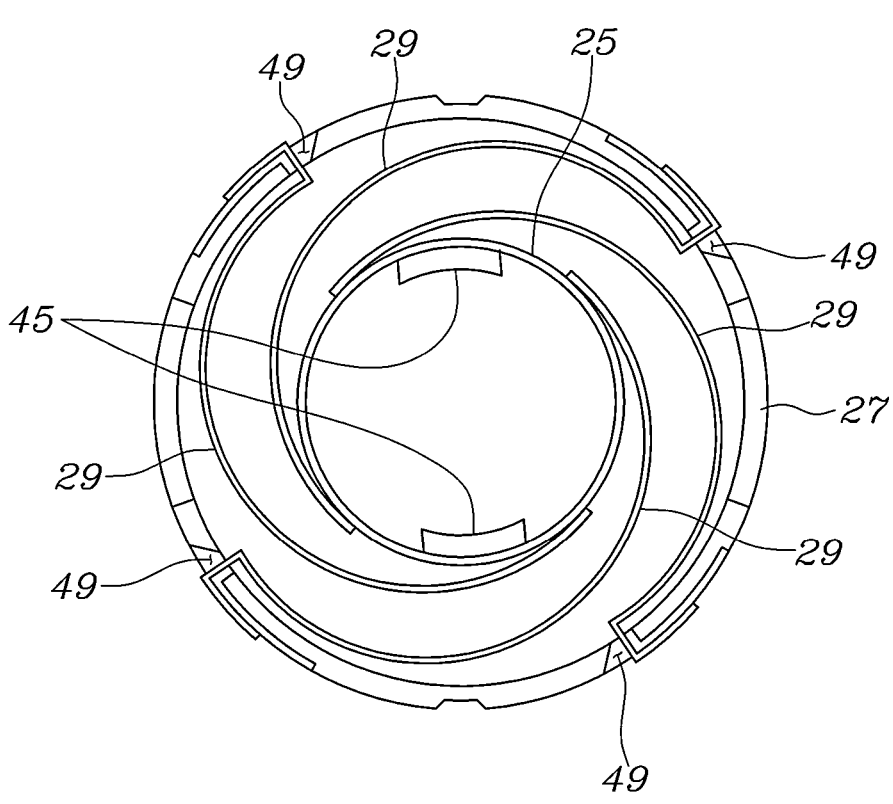
FIG. 10 is a view viewed in the direction of X-X of FIG.

Here, the surface of the leaf spring may be the largest area of the leaf spring, and this surface is disposed to form a plane perpendicular to a plane perpendicular to the lengthwise direction of the sleeve 25, so that the guide spring 29 can be transformed on the plane (the same plane as shown in FIG. 10) perpendicular to the lengthwise direction of the sleeve 25 if possible, when the sleeve 25 moves with respect to the second fixing guide 27.

In other words, the guide spring 29 includes the plurality of leaf springs disposed between the second fixing guide 27 and the sleeve 25 to form a vortex shape centered upon the sleeve 25 as shown in FIG. 10. Thus, the plurality of leaf springs are immediately restored to their original positions and postures even when the sleeve is moved or changed in posture within the second fixing guide 27.

Therefore, the sleeve 25 can guide the fastening bolt 5 to always maintain a fastening angle in a correct posture and a stable state, and press the fastening bolt 5 upward so that the center of the sleeve 25 can be automatically aligned with the center of the weld nut 19 even though the center of the fastening bolt 5 is slightly misaligned with the center of the weld nut 19 of the vehicle body 17, thereby having an effect on guiding the fastening bolt 5 to be smoothly and stably fastened to the weld nut 19.

According to this embodiment, the guide spring 29 has an end portion bent to have a 'U'-shape to be fixed to the second fixing guide 27, and the U-shaped end portion of the guide spring 29 is fitted to a spring mounting groove 49 formed in the second fixing guide 27 while surrounding both wall sides of the second fixing guide 27.

Further, the spring mounting groove 49 of the second fixing guide 27 is opened upwards, and the upper restricting portion 35 of the first fixing guide 23 is formed to restrict the upper end of the spring mounting groove 49 in which the guide spring 29 is inserted.

Therefore, the guide spring 29 is easily coupled to the second fixing guide 27, and the upper restricting portion 35 of the first fixing guide 23 blocks the upper end of the spring mounting groove 49 when the first fixing guide 23 and the second fixing guide 27 are coupled in the state that the guide spring 29 is inserted in the spring mounting groove 49 of the second fixing guide 27, thereby firmly maintaining the state that the guide spring 29 is firmly coupled to the second fixing guide 27.

Meanwhile, the opening 1, which is provided in the battery assembly 3 so as to mount the swappable assembly 7 thereto as described above, may be formed in the mounting bush 11 coupled to the side member 9 of the battery assembly 3.

Figure 4:
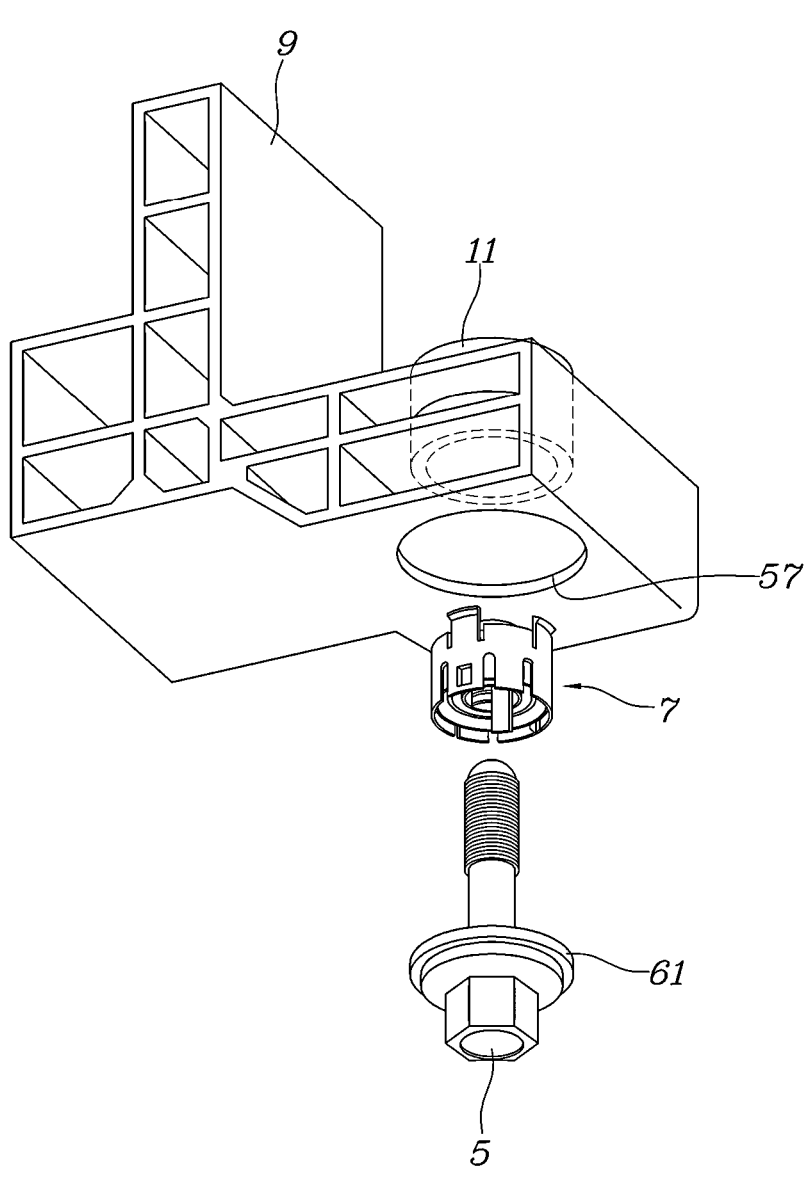
FIG. 4 is a view three-dimensionally illustrating that the swappable assembly and a fastening bolt are coupled to a mounting bush of a side member.
Figure 5:
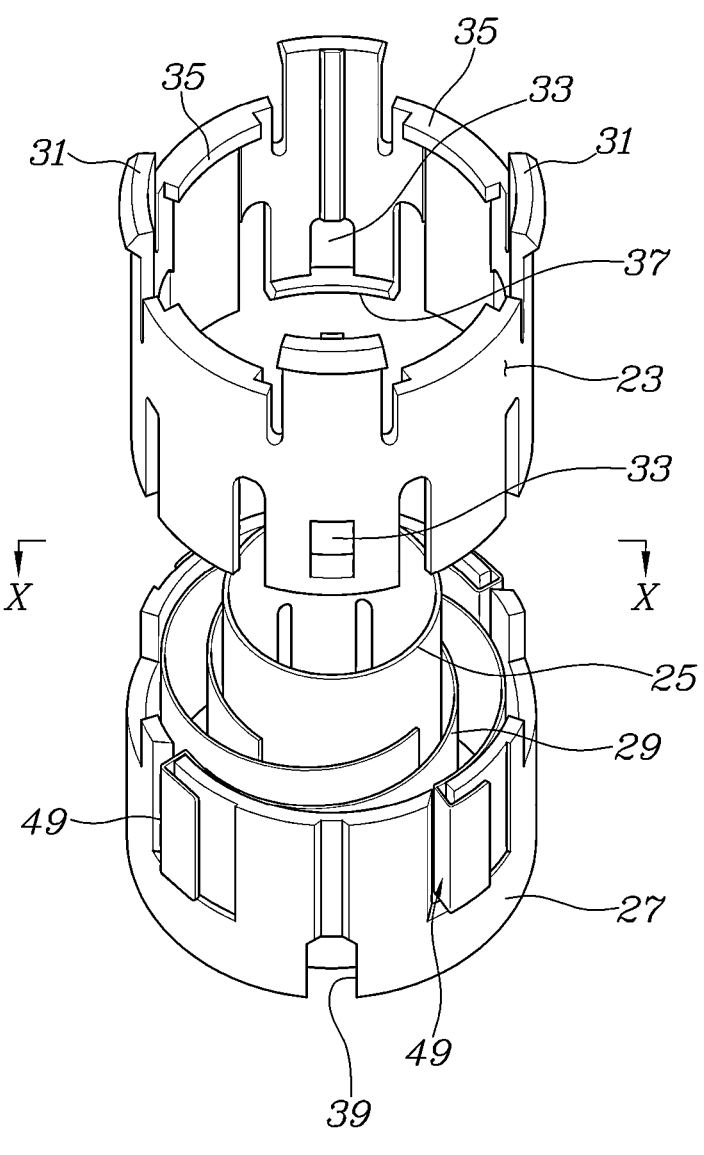
FIG. 5 is a view illustrating a detailed structure of the swappable assembly.
Figure 6:
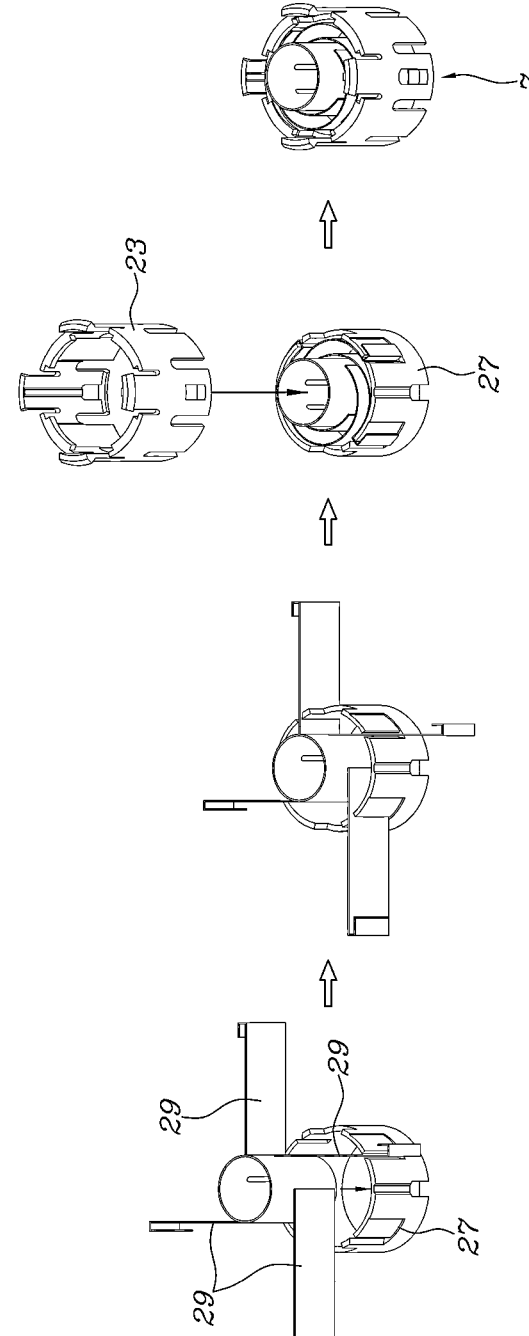
FIG. 6 is a view illustrating an assembling method of the swappable assembly.

For reference, FIGS. 2 to 4 illustrate a case where the opening 1 is formed in the mounting bush 11 coupled to the side member 9 as described above, and FIGS. 11 and 12 illustrate a case where the opening 1 is formed in the through pipe 13.

The side member 9 includes a lower end supporter 51 supporting the lower end of the mounting bush 11, and the lower end supporter 51 is formed with an assembly through hole 53 via which the swappable assembly 7 passes to be inserted in or separated from the mounting bush 11.

Therefore, the assembly through hole 53 allows the swappable assembly 7 to be easily coupled to the mounting bush 11 from a lower side toward an upper side and easily separated from the mounting bush 11 from the upper side toward the lower side, while securing a structure for firmly coupling the lower end of the mounting bush 11 to the lower end supporter 51.

The side member 9 has a cross-sectional structure where the lower end supporter 51 and a surrounding supporter 44 disposed above the lower end supporter 51 and surrounding and supporting the mounting bush 11 are spaced apart up and down from each other.

Therefore, the lower end of the mounting bush 11 is supported on the lower end supporter 51, and at the same time the circumference of the mounting bush 11 is integrated into the surrounding supporter 55 by welding or the like, thereby very firmly coupling with the side member 9.

Further, according to an embodiment, the side member 9 has a cross-sectional structure where a head cover 59 formed with a head through hole 57, through which the head of the fastening bolt 5 passes, is disposed in the lower side of the lower end supporter 51 as being spaced apart therefrom.

Therefore, the head cover 59 formed with the head through hole 57 allows the head of the fastening bolt 5 and a washer 61 to pass therethrough from the lower side toward the upper side, and at the same time forms a compact structure surrounding at least a part of the head as shown in FIG. 2 in the state that the fastening bolt 5 is completely fastened to the weld nut 19 of the vehicle body 17.

Further, the head through hole 57 serves to guide a tool to be inserted therethrough when the tool is used in loosening the fastening bolt 5, thereby having an effect on improving maintenance.

Figure 11:
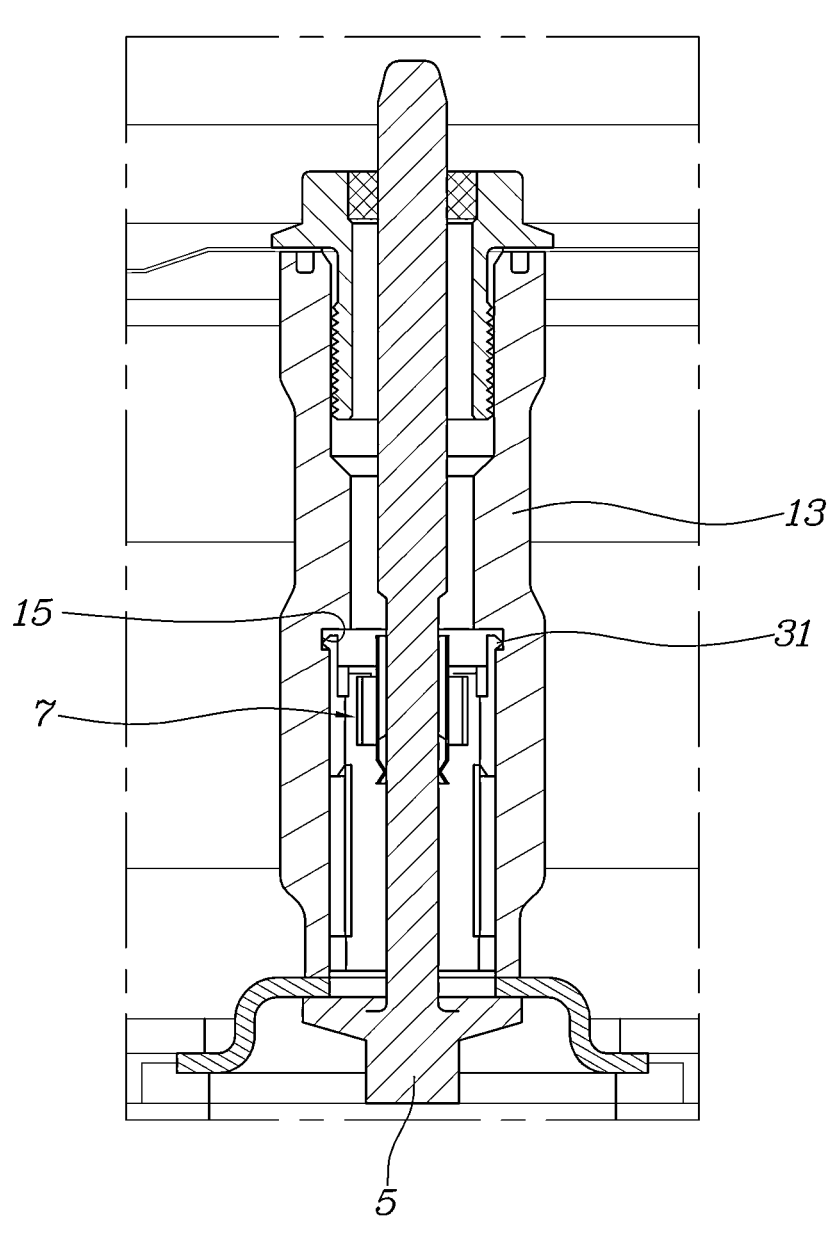
FIG. 11 is a longitudinal cross-section view of a through pipe, taken along line XI-XI of FIG. 1.
Figure 12:
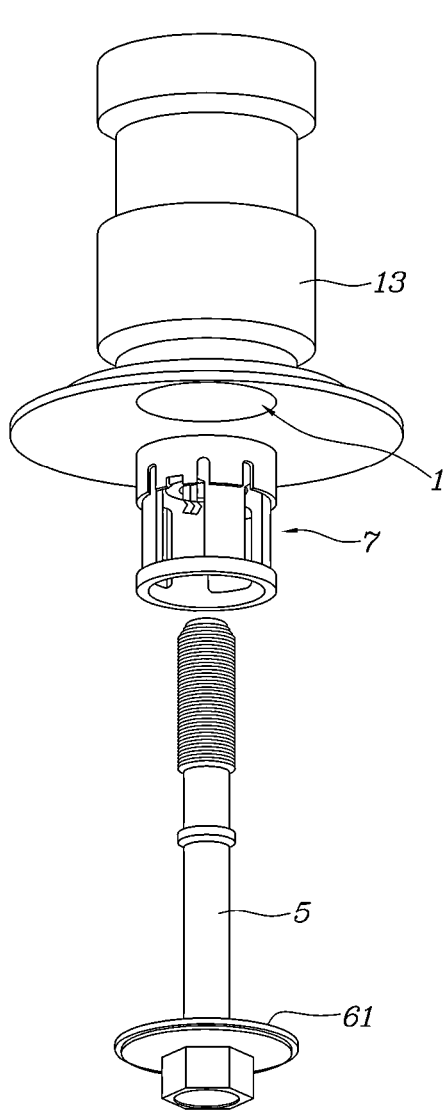
FIG. 12 is a view three-dimensionally illustrating that a swappable assembly and a fastening bolt are coupled to the through pipe of FIG. 11.

Meanwhile, as shown in FIGS. 11 and 12, the opening 1 may be formed in a through pipe 13 installed passing through the inside of the battery assembly 3.

In this case, the swappable assembly 7 is elastically hooked to the fixing groove 15 formed inside the through pipe 13.

Although specific embodiments of the disclosure have been illustrated and described as above, various modifications and changes can be made by a person having ordinary knowledge in the art without departing from the scope of technical ideas of the present disclosure.

What is claimed is:

1. A battery assembly mounting structure for a vehicle, comprising:
   a battery assembly provided with an opening having a constant shape in cross section from a lower side toward an upper side of the opening;
   a fastening bolt configured to pass through the opening from the lower side to the upper side; and
   a swappable assembly comprising an outer side and an inner side and configured to provide elastic support between the outer side and the inner side,
   wherein the outer side is configured to be mounted to and demounted from the opening through the lower side of the opening, and the fastening bolt is mounted to and demounted from the inner side,
   wherein the swappable assembly comprises:
      a first fixing guide rectilinearly moving upwards toward the opening and coupled to an inside of the opening;
      a sleeve elastically supporting the fastening bolt to be mounted and dismounted inside the first fixing guide;
      a second fixing guide disposed between the first fixing guide and the sleeve; and
      a guide spring elastically supporting the sleeve with respect to the second fixing guide.

2. The battery assembly mounting structure of claim 1, wherein the first fixing guide is integrally provided with:
   a fixing protrusion elastically coupled to a fixing groove formed inside the opening; and
   a tool insertion hole through which a tool is inserted to pull the first fixing guide downwards from the opening so that the fixing protrusion is separated from the fixing groove.

3. The battery assembly mounting structure of claim 2, wherein the first fixing guide is integrally provided with:
   an upper restricting portion for restricting an upper end of the second fixing guide; and
   a lower restricting portion for elastically restricting a lower end of the second fixing guide.

4. The battery assembly mounting structure of claim 3, wherein:
   the lower end of the second fixing guide is formed with a tool insertion groove communicating with the tool insertion hole of the first fixing guide; and
   the lower restricting portion of the first fixing guide is formed to block the lower end of the tool insertion groove.

5. The battery assembly mounting structure of claim 3, wherein the sleeve comprises:
   a cylindrical unit guiding the fastening bolt to rectilinearly move up and down while surrounding an outer circumference of the fastening bolt;
   a plurality of elastic supporters protruding downward from the cylindrical unit; and
   a holding protrusion having a shape that becomes narrower toward an inside of the cylindrical unit and wider again upward from a lower end of the elastic supporter.

6. The battery assembly mounting structure of claim 5, wherein the sleeve comprises a plurality of cut-out grooves cut in up and down directions of the cylindrical unit to separate the elastic supporter and the cylindrical unit.

7. The battery assembly mounting structure of claim 3, wherein
   the guide spring comprises a plurality of leaf springs connecting the second fixing guide and the sleeve; and
   a surface of the plurality of leaf springs is disposed in parallel to a lengthwise direction of the sleeve.

8. The battery assembly mounting structure of claim 7, wherein the plurality of leaf springs is disposed between the second fixing guide and the sleeve to form a vertex shape centered upon the sleeve.

9. The battery assembly mounting structure of claim 7, wherein:
   the guide spring comprises an end portion bent to have a U-shape to be fixed to the second fixing guide; and
   the U-shaped end portion of the guide spring is fitted to a spring mounting groove formed in the second fixing guide while surrounding both wall sides of the second fixing guide.

10. The battery assembly mounting structure of claim 9, wherein:
   the spring mounting groove of the second fixing guide is opened upwards; and
   the upper restricting portion of the first fixing guide is formed to restrict the upper end of the spring mounting groove in which the guide spring is inserted.

11. The battery assembly mounting structure of claim 2, wherein the opening is formed in a mounting bush coupled to a side member of the battery assembly.

12. The battery assembly mounting structure of claim 11, wherein:
   the side member comprises a lower end supporter to support the lower end of the mounting bush; and
   the lower end supporter is formed with an assembly through hole via which the swappable assembly passes to be inserted in or separated from the mounting bush.

13. The battery assembly mounting structure of claim 12, wherein the side member comprises a cross-sectional structure where the lower end supporter and a surrounding supporter disposed above the lower end supporter and surrounding and supporting the mounting bush are spaced apart up and down from each other.

14. The battery assembly mounting structure of claim 13, wherein the side member comprises a cross-sectional structure where a head cover formed with a head through hole, through which a head of the fastening bolt passes, is disposed being separated from the lower side of the lower end supporter.

15. The battery assembly mounting structure of claim 2, wherein the opening is formed in a through pipe installed passing through an inside of the battery assembly.

* * * * *